United States Patent [19]

Buckley et al.

[11] Patent Number: 4,937,013

[45] Date of Patent: * Jun. 26, 1990

[54] PROCESS FOR PREPARING LIQUID CRYSTALLINE POLYMER COMPOSITES

[75] Inventors: Alan Buckley, Berkeley Heights; Tessie M. Che, Westfield; Thomas M. Leslie, Clinton Township, Hunterdon County; James B. Stamatoff, Westfield; Dagobert E. Stuetz, Watchung, all of N.J.; Donald R. Ulrich, Alexandria, Va.

[73] Assignee: Hoechst Celanese Corp., Somerville, N.J.

[*] Notice: The portion of the term of this patent subsequent to Aug. 23, 2005 has been disclaimed.

[21] Appl. No.: 247,427

[22] Filed: Sep. 19, 1988

Related U.S. Application Data

[62] Division of Ser. No. 15,758, Apr. 10, 1987, Pat. No. 4,828,888.

[51] Int. Cl.$^5$ .................. C09K 19/52; C09K 19/54
[52] U.S. Cl. .................. 252/299.01; 252/299.5; 350/350 R; 428/1
[58] Field of Search .............. 252/299.01; 350/350 R; 428/1; 501/80

[56] References Cited

U.S. PATENT DOCUMENTS

| | | | |
|---|---|---|---|
| 4,221,578 | 9/1980 | Shoup et al. | 65/901 |
| 4,389,233 | 6/1983 | Kurosaki et al. | 65/531 |
| 4,397,666 | 8/1983 | Mishima et al. | 65/18.1 |
| 4,477,580 | 10/1984 | Fleming, Jr. | 501/12 |
| 4,605,428 | 8/1986 | Johnson, Jr. et al. | 65/18.1 |
| 4,671,618 | 6/1987 | Wu et al. | 350/350 R |
| 4,680,048 | 7/1987 | Motoki et al. | 65/18.1 |
| 4,765,818 | 8/1988 | Che et al. | 65/18.1 |
| 4,814,211 | 3/1989 | Buckley et al. | 252/299.01 X |

FOREIGN PATENT DOCUMENTS

| | | |
|---|---|---|
| 50-053 | 5/1975 | Japan. |
| 1068976 | 1/1984 | U.S.S.R. . |

Primary Examiner—Matthew A. Thexton
Assistant Examiner—James M. Covert
Attorney, Agent, or Firm—Depaoli & O'Brien

[57] ABSTRACT

This invention provides an optical medium which consists of a composite of a homogeneous inorganic oxide glass monolith with a microporous structure containing a liquid crystalline polymer component.

In one embodiment this invention provides a sole-gel process for producing a composite of a transparent homogeneous microporous inorganic oxide glass monolith and a liquid crystalline polymer.

2 Claims, No Drawings

PROCESS FOR PREPARING LIQUID CRYSTALLINE POLYMER COMPOSITES

This application is a division of application Ser. No. 015,758 filed Apr. 10, 1987, now U.S. Pat. No. 4,828,888.

BACKGROUND OF THE INVENTION

Liquid crystalline materials are utilized in a variety of electrooptical and display device applications, in particular those which require compact, energy efficient, voltage-controlled light valves such as calculator displays.

Illustrative of organic materials which exhibit liquid crystalline behavior are (1) relatively stiff elongated molecules such as 4,4'-azoxyanisole; (2) polymers which are wholly aromatic in structure such as a copolymer of p-hydroxybenzoic acid and 6-hydroxy-2-naphthoic acid; and polymers with a flexible main chain and with side chains which exhibit mesogenic properties.

Low molecular weight liquid crystalline compounds exhibit optical properties while in the liquid mesogenic phase. Liquid crystalline polymers exhibit a thermotropic mesophase, and have the additional advantage that the optical properties can be preserved in the solid state.

As a further embodiment, liquid crystalline compounds have been incorporated as minute droplets in a porous polymeric matrix to protect the reactive material from atmospheric conditions and to enhance electric field behavior. Polymeric encapsulated liquid crystalline materials are described in U.S. Pat. Nos. 3,600,060; 4,048,358; and 4,579,423.

While the encapsulation of a liquid crystalline material in a polymeric matrix has desirable advantages, there are disadvantages associated with this type of composite structure. The polymer tends to cause spectral shifts of both absorption and emission wavelengths, and it can affect the photostability of the liquid crystalline material, and typically the polymeric matrix does not have a broad range of optical transparency.

Of background interest with respect to the present invention is Japanese Patent 73JP-098101 which describes a thermal type liquid crystal display device which consists of (1) a porous glass structure prepared by heating borosilicate glass to cause separation of phases, and leaching the boron oxide-rich and sodium oxide-rich phase with sulfuric acid to form a silica-rich porous glass; (2) a liquid crystal material in the pore volume; (3) a heating element coated on the porous glass in a pattern, and (4) a transparent protective cover.

Other publications of interest which describe the production of inorganic-organic composites are J. Phys. Chem., 88, 5956 (1984) and J. Non-Cryst. Solids, 74, 395 (1985) by D. Avnir et al, and Mat. Res. Soc. Symp. Proc., 73, 809 (1986) by Pope et al; incorporated herein by reference.

There is continuing interest in the development of improved liquid crystalline materials and structures which exhibit exceptional properties for specialized applications.

Accordingly, it is an object of this invention to provide novel liquid crystalline polymer composites.

It is another object of this invention to provide a transparent optical medium which is a solid composite of a homogeneous porous inorganic oxide glass and a liquid crystalline polymer component with enhanced photostability.

It is another object of this invention to provide a process for producing novel liquid crystalline polymer composites.

It is a further object of this invention to provide optical devices which contain a novel liquid crystalline polymer composite optical component.

Other objects and advantages of the present invention shall become apparent from the accompanying description and examples.

The subject matter of this patent application is related to that disclosed in copending patent application Ser. No. 15,757, filed Apr. 10, 1987, now U.S. Pat. No. 4,814,211, and copending patent application Ser. No. 15,758, filed Apr. 10, 1987, now U.S. Pat. No. 4,828,888.

DESCRIPTION OF THE INVENTION

One or more objects of the present invention are accomplished by the provision of an optical medium comprising a composite composition of a homogeneous inorganic oxide glass monolith with a microporous structure containing a liquid crystalline component.

The glass monolith typically is comprised of silica either alone or in combination with up to about 20 weight percent of one or more other inorganic oxides of elements such as lithium, sodium, potassium, rubidium, cesium, magnesium, calcium, strontium, barium, titanium, zirconium, vanadium, tantalum, chromium, molybdenum, tungsten, manganese, iron, nickel, cobalt, copper, zinc, cadmium, boron, aluminum, phosphorus, gallium, germanium, tin, arsenic, antimony, bismuth, selenium, and the like.

A present invention glass monolith microporous structure nominally has a pore volume between about 10–80 percent of the total volume, and has pore diameters in the range between about 15–2000 angstroms. The average pore diameter typically is in the range between about 50–300 angstroms.

The glass monolith can be in the form of thin coatings on transparent or reflective substrates; films; plates; cubes; cylinders; prisms; fibers; and the like.

The liquid crystalline component can occupy between about 1–99 percent of the microporous volume of the glass monolith, and usually it occupies between about 5–95 percent of the microporous volume.

The liquid crystalline component can be homogeneously distributed throughout the microporous volume. In another embodiment the liquid crystalline component is concentrated in a zone of the microporous structure which is adjacent to a surface of the glass monolith. As an alternative, the glass monolith can have microporosity in one or more zones, and the microporous volume of a zone contains liquid crystalline component.

In another embodiment the content of the liquid crystalline component has a gradient distribution in the microporous structure of an invention glass monolith.

In another embodiment this invention provides a transparent optical medium which is coated on a transparent or reflective substrate, wherein the optical medium is a composite composition comprising a homogeneous inorganic oxide glass monolith with a microporous structure containing a liquid crystalline component.

In another embodiment this invention provides an optical light switch or light modulator device with an optical medium component comprising a composite composition consisting of a homogeneous inorganic oxide glass monolith with a microporous structure containing a liquid crystalline component.

In another embodiment this invention provides a transparent optical medium which is in the form of a thin sheet having a thickness less than about 2 millimeters and which has each side surface coated with a transparent electrically conductive film, wherein the optical medium is a composite composition comprising a homogeneous inorganic oxide glass monolith with a microporous structure containing a liquid crystalline component.

The term "transparent" as employed herein refers to an optical medium which is transparent or light transmitting with respect to incident fundamental light frequencies and created light frequencies. In an optical device, a present invention liquid crystalline composite optical medium is transparent to both the incident and exit light frequencies.

Preparation Of Porous Inorganic Oxide Glass Monoliths

The various methods for the manufacture of porous glass are reviewed in U.S. Pat. No. 4,528,010. The methods include the Vycor (Corning), chemical vapor deposition, white carbon, colloid silica, and silica gel procedures.

One method of producing a porous glass body involves (1) forming an article of desired shape from a parent borosilicate glass; (2) thermally treating the glass article at a temperature of 500°–600° C. to separate the glass into a silica-rich phase and a silica-poor phase; (3) dissolving or leaching the silica-poor phase with acid to provide a porous structure composed of the silica-rich phase; and (4) washing to remove leaching residue, and then drying.

Embodiments for production of porous inorganic oxide glass monoliths by leaching of a soluble phase from a solid glass structure are described in U.S. Pat. Nos. 2,106,744; 2,286,275; 2,303,756; 2,315,328; 2,480,672; 3,459,522; 3,843,341; 4,110,093; 4,112,032; 4,236,930; 4,588,540; and references cited therein; incorporated herein by reference.

U.S. Pat. No. 4,584,280 describes a process for preparing a transparent porous ceramic film which involves applying an anhydrous solution containing an organometallic compound and a multifunctional organic compound to a substrate; and then thermally decomposing the organic compounds.

A more recent development is the "sol-gel" process for preparation of porous monolithic glasses and ceramics at moderate temperatures. The sol-gel procedure involves the formation of a three-dimensional network of metal oxide bonds at room temperature by a hydrolysis-condensation polymerization reaction of metal alkoxides, followed by low temperature dehydration. The resultant porous glass structure optionally can be sintered at elevated temperatures.

In another embodiment this invention provides a process for producing a composite composition comprising a homogeneous inorganic oxide glass monolith with a microporous structure containing a liquid crystalline component, which comprises hydrolyzing tetraalkoxysilane under acidic or basic pH conditions in a sol-gel reaction medium comprising water, a water-miscible organic solvent and a liquid crystalline component, until gellation of the reaction medium is completed, and removing the solvent medium to provide a porous glass monolith with incorporated liquid crystalline component.

In another embodiment this invention provides a process for producing a composite composition comprising an inorganic oxide glass monolith with a microporous structure containing a liquid crystalline component, which comprises (1) hydrolyzing tetraalkoxysilane under acidic or basic pH conditions in a sol-gel reaction medium comprising water and a water-miscible organic solvent until gellation of the reaction medium is completed; (2) removing the solvent medium to provide a porous glass monolith; and (3) impregnating the porous glass monolith with a liquid crystalline component.

The term "homogeneous" as employed herein with reference to a porous glass monolith means that the inorganic oxide composition and the microstructure are substantially invariant throughout the monolith.

Embodiments for production of porous inorganic oxide glass monoliths by the sol-gel process are described in U.S. Pat. Nos. 3,640,093; 3,678,144; 3,681,113; 3,811,918; 3,816,163; 3,827,893; 3,941,719; 4,327,065; 4,389,233; 4,397,666; 4,426,216; 4,432,956; 4,472,510; 4,477,580; 4,528,010; 4,574,063; and references cited therein; incorporated herein by reference. Mat. Res. Soc. Symp. Proc., 73, 35 (1986) by Hench et al describes the role of chemical additives in sol-gel processing; incorporated herein by reference.

Illustrative of water-miscible solvents employed in a sol-gel process embodiment are alkanols such as methanol and ethanol; ketones such as acetone and methyl ethyl ketone; esters such as methyl acetate and ethyl formate; ethers such as dioxane and tetrahydrofuran; amides such as dimethylformamide, dimethylacetamide and 1-methyl-2-pyrrolidinone; and the like.

Acidic pH conditions in the sol-gel process can be provided by the addition of mineral acids such as hydrochloric acid, and basic pH conditions can be provided by the addition of bases such as ammonium hydroxide.

Illustrative of tetraalkoxysilanes and other metal and metalloid alkoxides are methoxy and ethoxy derivatives of silicon, lithium, magnesium, titanium, manganese, aluminum, tin, antimony, and the like. Aryloxy derivatives also can be utilized in the sol-gel process.

Porous glass monoliths produced by a sol-gel process embodiment have an advantageous combination of properties, and generally have superior optical properties as compared to porous glass monoliths prepared by other techniques, e.g., by the leaching of a silica-poor phase from a borosilicate glass.

A sol-gel derived porous glass monolith is homogeneous and the inorganic matrix can be obtained essentially free of inorganic or organic impurities, e.g., less than 2 weight percent of impurities.

A sol-gel derived porous glass monolith typically has a pore structure in which substantially all of the pores have diameters within about a 100 angstrom diameter variation range, e.g., within a range between about 50–150 or 300–400 or 900–1000 angstroms, as determined by sol-gel processing conditions.

A sol-gel derived porous glass monolith can have exceptional optical properties because the inorganic matrix is homogeneous in chemical composition and physical structure. Since there is minimized light scattering, the sol-gel derived porous glass monolith exhibits excellent optical transparency and light transmitting ability.

Liquid Crystalline Component

The liquid crystalline component of the invention composite compositions can be selected from a broad variety of known compounds, oligomers and polymers which exhibit smectic, nematic and/or cholesteric mesophases.

The mesophase temperature can vary in the broad range between about 0°–150° C., depending on the chemical structure of a particular liquid crystal component. Mixtures of liquid crystals can be employed to provide a medium which has a mesophasic state at ambient temperatures.

The liquid crystalline component also can be employed in combination with an organic dye, such as anthraquinone dye D-16 (B.D.H. Chemicals) and azo dye GR-8 (Japan Photosensitive Pigment Research Institute).

Various classes of liquid crystalline compounds are described in U.S. Pat. Nos. 3,322,485; 3,499,702; 4,032,470; 4,105,654; 4,228,030; 4,323,473; 4,382,012; 4,556,727; 4,576,732; 4,592,858; 4,550,980; 4,601,846; and references cited therein; incorporated herein by reference.

The liquid crystalline component of the invention composite composition also can have a polymeric structure. Illustrative of this class of organic materials is a liquid crystalline polymer which is characterized by a recurring wholly aromatic structural unit corresponding to the formula:

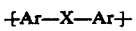

where X is a divalent radical selected from estero, amido, azomethino, azo, azoxy, etheno and ethyno groups, and Ar is a divalent aromatic radical selected from phenylene, naphthylene and diphenylene groups, and aromatic radicals corresponding to the formula:

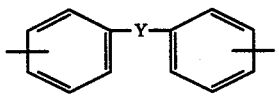

where Y is a carbonyl, sulfono, oxy or thio group.

Illustrative of a wholly aromatic liquid crystalline polymer component is a copolymer of p-hydroxybenzoic acid and 6-hydroxy-2-naphthoic acid.

The term "wholly aromatic" as employed herein refers to a linear thermotropic liquid crystalline polymer in which each recurring monomeric unit contributes at least one aromatic nucleus to the polymer backbone.

The term "thermotropic" as employed herein refers to polymers which are liquid crystalline (i.e., anisotropic) in the melt phase.

Wholly aromatic thermotropic liquid crystalline polymers are disclosed in U.S. Pat. Nos. 3,526,611; 3,991,013; 4,048,148; 4,057,597; 4,066,620; 4,067,852; 4,075,262; 4,083,829; 4,107,143; 4,118,372; 4,122,070; 4,130,545; 4,146,702; 4,153,779; 4,156,070; 4,159,365; 4,161,470; 4,169,933; 4,181,792; 4,184,996; 4,188,476; 4,219,461; 4,224,433; 4,230,817; 4,238,598; 4,238,599; 4,256,624; 4,332,759; and 4,381,389; incorporated herein by reference.

Another type of liquid crystalline polymer is illustrated by a side chain liquid crystalline polymer which is characterized by a recurring structural unit corresponding to the formula:

where P is a polymer main chain unit, S is a flexible spacer group having a linear chain length of between about 1–20 atoms, M is a pendant mesogen, and where the pendant mesogens comprise at least about 10 weight percent of the polymer and the polymer has a glass transition temperature above about 40° C.

Side chain liquid crystalline polymers are disclosed in U.S. Pat. Nos. 4,293,435; 4,358,391; and 4,410,570; incorporated herein by reference.

Other literature describing side chain liquid crystalline polymers include J. Polym. Sci., 19, 1427 (1981); Eur. Polym. J., 18, 651 (1982); Polymer, 26, 615 (1985); incorporated herein by reference.

Liquid crystalline polymer technology is reviewed in "Polymeric Liquid Crystals", (Plenum Publishing Corporation, New York, 1985), and in "Polymer Liquid Crystals" (Academic Press, New York, 1982); incorporated herein by reference.

External Field Induced Liquid Crystal Orientation

The term "external field" as employed herein refers to an electric or magnetic field which is applied to a substrate of mobile organic molecules, to induce dipolar alignment of the molecules parallel to the field.

Liquid crystals (including polymeric liquid crystals) may be aligned by the application of an external field to a matrix of liquid crystal molecules. The degree of orientation is determined by the orientational order parameter. For both nematic and smectic mesophases, the parameter is defined in terms of a director which is a vector parallel to the molecular long axis (and perpendicular to the plane of molecular layering in the case of the smectic mesophase).

If theta is defined as the angle between the director and a chosen axis, then the orientational order parameter is defined as the average over all molecules of the second Legendre polynomial. The parameter ranges from −0.5 to 1.0 (1.0 corresponds to perfect uniaxial alignment along a given axis. 0.0 corresponds to random orientation, and −0.5 corresponds to random orientation confined in a plane perpendicular to a given axis).

The order parameter thus defined does not distinguish between parallel and antiparallel alignment. Thus, a sample of asymmetric rod-like molecules would have an order parameter of 1.0 for both the case in which the molecules are colinear and all pointed in the same direction, and the case in which the molecules are colinear and form antiparallel pairs.

The application of an orienting external field to an array of nematic liquid crystal molecules results in an order parameter of approximately 0.65. Deviations from ideal order are due to nematic fluctuations on a micron length scale which accommodate characteristic defects. These fluctuations may be dynamic for small molecule liquid crystals or frozen for polymeric liquid crystals. In either case, nematic fluctuations scatter light so that aligned samples appear to be hazy (particularly in a thick sample).

Smectic liquid crystals may be aligned by application of an orienting external field, with a resulting order parameter exceeding 0.9. Unlike the nematic phase, characteristic defects are removed upon aligning the smectic phase and thereby forming a single liquid crystal phase. Such phases are known as monodomains and, because there are no defects, are optically clear.

For both the nematic and smectic mesophases, application of a DC electric field produces orientation by torque due to the interaction of the applied electric field and the net molecular dipole moment. The molecular dipole moment is due to both the permanent dipole moment (i.e., the separation of fixed positive and negative charge) and the induced dipole moment (i.e., the separation of positive and negative charge by the applied field).

The torque which results by the application of a DC electric field normally would only produce very slight alignment even for high dipolar and polarizable molecules at room temperature. The alignment torque is negligible in comparison with the disordering effect of thermally induced rotation (i.e., the Boltzman distribution of rotational eigenstates at room temperature). However, due to the unique associations developed by liquid crystalline molecules through intermolecular forces, long range orientational order on a micron length scale is present. Under these conditions, bulk orientation of the sample by application of aligning fields exceeding a few volts/cm can produce the degrees of alignment indicated above.

Application of an AC electric field also can induce bulk alignment. In this case, orienting torque occurs solely due to the interaction of the applied AC field and the induced dipole moment. Typically, AC field strengths exceeding 1 kV/cm at a frequency exceeding 1 KHz are employed for the nematic phase. At these frequencies, rotational motion of aligned nematic regions is not sufficient to follow the field. As a direct result, torque due to the interaction of the applied field and any permanent dipole moment over time averages to zero. However, electronically induced polarization is a very rapid process so that the induced dipole moment changes direction depending upon the direction of the applied field resulting in a net torque.

Application of a magnetic field also can effect alignment. Organic molecules do not possess a permanent magnetic dipole moment. In a manner analogous to AC electric field, a magnetic field can induce a net magnetic dipole moment. Torque results from the interaction of the induced dipole moment and the external magnetic field. Magnetic field strengths exceeding 10 Kgauss are sufficient to induce alignment for a nematic phase.

Alignment of nematics by electric or magnetic fields are accomplished simply by application of the field to the nematic material. Alignment of the smectic phase is more difficult due to a higher viscosity which decreases rotational freedom. Formation of aligned smectic monodomains can be achieved by orienting a material in the nematic phase, and cooling the material into the smectic phase while maintaining the aligning field. For materials which have only smectic and isotropic phases and which lack a nematic phase, alignment can be accomplished in the smectic phase at an elevated temperature near the smectic to isotropic transition temperature, e.g., sufficiently close to the transition temperature so that the medium may contain smectic domains in an isotropic fluid.

The methods described above to produce oriented materials apply to both small molecule liquid crystals and polymeric liquid crystals. For polymers which possess a glass transition, the aligned liquid crystalline phase can be frozen by rapid cooling below the glass transition temperature.

Publications relating to external field-induced liquid crystal molecular orientation include The Physics of Liquid Crystals, P. G. deGennes, p. 95–97, Oxford University Press, 1974; J. Stamatoff et al, "X-Ray Diffraction Intensities of a Smectic-A Liquid Crystal", Phys. Rev. Letters, 44, 1509–1512, 1980; J. S. Patel et al, "A Reliable Method of Alignment for Smectic Liquid Crystals: Ferroelectrics, 59, 137–144, 1984; J. Cognard, "Alignment of Nematic Liquid Crystals and Their Mixtures", Mol. Cryst. Liq. Cryst.: Suppl., 1982; incorporated herein by reference.

A present invention composite of a sol-gel derived porous glass monolith and a liquid crystalline component exhibits unique optical properties. Because of the homogeneity of the inorganic monolith and the relatively small average pore size (e.g., 50–100 angstroms), the composite appears optically transparent either with random or with uniaxial oriented liquid crystalline molecules. The composite is characterized by very fast and large electric field-induced birefringence.

It is believed that there are surface charges on the internal interfaces between the inorganic monolith phase and the liquid crystal phase. These surface charges tend to restore each domain to its original direction of alignment in the absence of an electric field.

The following examples are further illustrative of the present invention. The components and specific ingredients are presented as being typical, and various modifications can be derived in view of the foregoing disclosure within the scope of the invention.

EXAMPLE I

A section of porous glass (3 cm×3 cm×3 mm) of 40–50 angstroms average pore diameter is submerged in a benzene solution containing 30% by weight of p-n-butoxybenzylidene-p'-aminobenzonitrile for one hour.

The impregnated glass section is withdrawn from the solution and dried under vacuum at 60° C. to remove the benzene solvent from the pore structure. The porous glass product is transparent.

The porous glass product is film coated with poly(methyl methacrylate) by dipping the liquid crystal impregnated porous glass into a methyl ethyl ketone solution of poly(methyl methacrylate) and then air drying.

The above procedure is repeated, except that the impregnated porous glass is coated on both sides with transparent electronically conductive indium-tin oxide.

In the absence of an electric field, the glass monolith is a non-scattering optical medium. Upon application of an electric field which aligns the liquid crystal molecules, the optical medium becomes birefringent. When combined with cross-polarizers, the induced birefringence in the glass/liquid crystal composite is effective as a light filter.

EXAMPLE II

A starting solution for the production of thin films is prepared by admixing 50 ml of ethanol, 50 ml of dioxane, 10 ml of tetramethoxysilane, 5 ml of 0.01N HCl, 3 g of Triton® X-100[(1)] and 0.1 g of p-azoxyanisole. The solution is allowed to stand for two hours at room temperature.

(1) Surfactant; Rohm & Haas Company.

Glass slides are dipped into the solution, and then dried at 110° C. for 10 hours. The resultant transparent film coating is a porous silicate monolith containing pore volume encapsulated p-azoxyanisole component.

In an alternative procedure, the p-azoxyanisole is not included in the film preparation solution. After glass slides are coated with porous silicate film, the glass slides are dipped into a benzene solution of p-azoxyanisole to impregnate the porous film coating with the solution. After glass slides are dried to remove the solvent, the resultant composite coating on the glass slides is a transparent silicate film with a microporous structure containing incorporated p-azoxyanisole.

EXAMPLE III

A transparent porous ceramic thin film is prepared in accordance with the procedure described in U.S. Pat. No. 4,584,280.

A 50 g quantity of tetraethoxysilane is dissolved in 100 g of isopropanol, and 20 g of ethanol containing 2% of 1% aqueous hydrochloric acid solution is added dropwise with stirring. This is followed by the addition of 20 g of ethanol containing 3% hydroxyethylcellulose, and the mixture is refluxed for 15 minutes with stirring to provide a clear viscous solution.

The solution is spread on the surface of a thin stainless steel plate and dried at room temperature. The coated plate is heated in a muffle furnace at a rate of 5° C./min, and maintained at 500° C. for one hour. After gradual cooling of the plate, a transparent thin film of silicate is evident on the stainless steel surface. The average pore size is in the range of 40–60 angstroms.

The coated plate is dipped into a 20% tetrahydrofuran solution of a graft copolymer of 4-methoxyphenyl-4-(2-propenoxy)benzoate and methylhydrogenpolysilane (as described in U.S. Pat. No. 4,358,391). The coated plate is dried at 100° C. to remove the solvent from the porous silicate film. The resultant porous silicate film has a content of incorporated liquid crystalline polymer.

EXAMPLE IV

A.

A porous glass plate (10 cm×10 cm×1 cm) of 100–120 angstroms average pore diameter is set in a shallow pan containing a 20% toluene solution of 4,4'-dimethoxystilbene. The one centimeter sides of the glass plate are submerged to a depth of 3 millimeters. After 2 minutes of immersion in the solution, the glass plate is withdrawn and dried to remove the toluene solvent. The resultant porous glass plate product has a 4,4'-dimethoxystilbene content which is concentrated in a zone of the microporous structure which is adjacent to one flat surface of the glass plate.

A similar product is obtained if the glass plate has porosity only in a narrow zone adjacent to one of the glass plate surfaces, and the pore volume is impregnated with a solution of liquid crystalline compound; or with an isotropic melt phase of the liquid crystalline compound.

B.

A porous glass plate (6 cm×6 cm×2 cm) of 80–100 angstroms average pore diameter is set in a shallow pan containing a 30% benzene solution of 50/50 p-n-ethoxybenzylidene-p'-aminobenzonitrile/p-n-butoxybenzylidene-p'-aminobenzonitrile (Crystal-nematic transition temperature of 41° C.) The 2 centimeter sides of the glass plate are submerged to a depth of 2 millimeters. After 20 minutes of immersion in the solution, the glass plate is withdrawn and dried to remove the benzene solvent.

The resultant porous glass plate product has a liquid crystalline content which has a gradient distribution in the microporous structure, from dense near one flat surface to less dense near the opposite flat surface. The gradient distribution is the effect of solvent capillary action in the interconnected microporous structure during the impregnation procedure.

What is claimed is:

1. A process for producing a composite composition comprising a homogeneous inorganic oxide glass monolith with a microporous structure containing a liquid crystalline component, which comprises (1) hydrolyzing tetraalkoxysilane under acidic or basic pH conditions in a sol-gel reaction medium comprising water and a water-miscible organic solvent until gellation of the reaction medium is completed; (2) removing the solvent medium by drying to provide a porous glass monolith; and (3) impregnating the porous glass monolith with a liquid crystalline polymer component; wherein the glass monolith microporous structure has pore diameters in the range between about 15–2000 angstroms, and substantially all of the pore diameters are within about a 100 angstrom diameter variation range.

2. A composite composition produced in accordance with the sol-gel process of claim 1.

* * * * *